(12) United States Patent
Onishi et al.

(10) Patent No.: US 6,936,315 B2
(45) Date of Patent: Aug. 30, 2005

(54) INK JET RECORDING MEDIUM, RECORDING METHOD THEREFOR, AND INK JET RECORDED ARTICLE

(75) Inventors: Hiroyuki Onishi, Nagano-ken (JP); Masahiro Hanmura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 10/107,522

(22) Filed: Mar. 26, 2002

(65) Prior Publication Data

US 2003/0059584 A1 Mar. 27, 2003

(30) Foreign Application Priority Data

Mar. 26, 2001 (JP) ........................................ 2001-088890

(51) Int. Cl.$^7$ ............................................... B41M 5/00
(52) U.S. Cl. ................ 428/32.1; 428/32.15; 428/195.1; 428/411.1; 428/212; 428/32.34; 347/105
(58) Field of Search ............................ 428/32.1, 32.15, 428/32.34, 411.1, 195.1, 212, 53.24; 347/105

(56) References Cited

FOREIGN PATENT DOCUMENTS

| | | | |
|---|---|---|---|
| JP | 59-155086 A | 9/1984 | |
| JP | 6049990 | 3/1985 | |
| JP | 60-067190 A | 4/1985 | |
| JP | 6083882 | 5/1985 | |
| JP | 6158788 | 3/1986 | |
| JP | 62174184 | 7/1987 | |
| JP | 2276670 | 11/1990 | |
| JP | 655829 | 3/1994 | |
| JP | 08-337999 | * 12/1996 | .......... D21H/19/36 |
| JP | 1086508 | 4/1998 | |
| JP | 10193776 | 7/1998 | |
| JP | 10217601 | 8/1998 | |
| JP | 303009 | 10/2000 | |

OTHER PUBLICATIONS

Patent Abstracts of Japan Publication No. 60–049990 dated Mar. 19, 1985.
Patent Abstracts of Japan Publication No. 60–083882 dated May 13, 1985.
Patent Abstracts of Japan Publication No. 61–058788 dated Mar. 26, 1986.
Patent Abstracts of Japan Publication No. 62–174184 dated Jul. 30, 1987.
Patent Abstracts of Japan Publication No. 02–276670 dated Nov. 13, 1990.
Patent Abstracts of Japan Publication No. 06–055829 dated Mar. 1, 1994.
Patent Abstracts of Japan Publication No. 10–086508 dated Apr. 7, 1998.
Patent Abstracts of Japan Publication No. 10–193776 dated Jul. 28, 1998.
Patent Abstracts of Japan Publication No. 10–217601 dated Aug. 18, 1998.
Patent Abstracts of Japan Publication No. 2000–303009 dated Oct. 31, 2000.

* cited by examiner

*Primary Examiner*—Rena Dye
*Assistant Examiner*—Tamra L. Dicus
(74) *Attorney, Agent, or Firm*—Ladas & Parry LLP

(57) ABSTRACT

An object of the present invention is to provide an ink jet recording medium for which the problem of bronzing is prevented and an image formed on the ink jet recording medium has good color representation, light-fastness and water resistance. The ink jet recording medium comprises a substrate, and an ink-receiving layer that consists of at least one layer, is provided on the substrate and has an outermost surface, wherein the degree of cationization at the outermost surface is different to, specifically less than, the degree of cationization in the ink-receiving layer other than the outermost surface.

15 Claims, 1 Drawing Sheet

INK JET RECORDING MEDIUM, RECORDING METHOD THEREFOR, AND INK JET RECORDED ARTICLE

BACKGROUND OF THE INVENTION

1. Field of the Invention

The present invention relates to an ink jet recording medium comprising a substrate and an ink-receiving layer provided on the substrate, more particularly such an ink jet recording medium for which the degree of cationization in the ink-receiving layer is controlled, and to a recording method for the ink jet recording medium, and an ink jet recorded article produced by recording an ink image on the ink jet recording medium.

2. Description of the Related Art

In the ink jet recording method, a discharge energy is applied to ink by using mechanical energy from a piezoelectric element or the like or thermal energy from a heat-generating body, thus discharging droplets of ink from a recording head onto recording paper and hence forming dots on the recording paper. This recording method has various good characteristics, such as recorded images being vivid, the driving apparatus being quiet, and it being easy to make color images, and has thus become more and more popular in recent years.

Known recording media for forming images (including writing) using the ink jet recording method include normal paper and also special ink jet recording paper having an ink-receiving layer on the recording surface side (front surface side). In recent years, it has come to be desired that vivid full-color images with yet higher resolution be formed on such recording media. With recent technical developments aimed at realizing high image quality, about the same high image quality as silver salt photographs has come to be demanded of ink jet recording media.

As described above, special ink jet recording paper generally has an ink-receiving layer, which contains a pigment and a water-soluble polymer such as polyvinyl alcohol. However, with an ink-receiving layer comprising such components, in the case that image formation is carried out using a water-soluble ink, the image formed has no water resistance, and hence the image quality is readily degraded.

To improve the water resistance of an image formed by attaching water-soluble ink onto the ink-receiving layer, art is known in which an organic water-soluble cationic polymer is used in the ink-receiving layer. Specifically, such ink-receiving layers are disclosed, for example, in Japanese Patent Application Laid-open No. S60-49990, Japanese Patent Application Laid-open No. S60-83882, Japanese Patent Application Laid-open No. S61-58788, Japanese Patent Application Laid-open No. S62-174164, Japanese Patent Application Laid-open No. H2-276670, Japanese Patent Application Laid-open No. H6-55829, Japanese Patent Application Laid-open No. H10-86508, Japanese Patent Application Laid-open No. H10-193776 and Japanese Patent Application Laid-open No. H10-217601.

However, although it is possible to confer a water resistance improving effect by making the ink-receiving layer contain a cationic polymer as described above, there are adverse effects on properties such as the ink absorbability and the light-fastness and colorability of images. In particular, in the case of colored inks, there may be large adverse effects on these properties due to differences in dye structure between the inks.

In particular, the dye molecules are larger in a cyan ink than a magenta ink or yellow ink, and thus tend not to penetrate easily into the ink-receiving layer. There is thus a tendency for the problem of 'bronzing' to occur in which the cyan dye agglomerates on the outermost surface of the ink-receiving layer, resulting in a drop in image quality. This tendency is particularly prominent with ink jet recording media having a glossy layer.

Moreover, the tendency of a cyan ink to discolor or fade more than a magenta ink or a yellow ink under acidic conditions or the presence of an oxidizing gas has been regarded as a problem from hitherto. With this in view, Japanese Patent Application Laid-open No. 2000-303009 discloses a cyan ink pigment for which this problem of cyan inks is resolved, specifically a novel copper phthalocyanine type pigment that is 'gas-resistant', i.e. resistant to discoloration or fading caused by oxidizing gases and the like.

However, even if a cyan ink containing the cyan pigment disclosed in Japanese Patent Application Laid-open No. 2000-303009 is used, the problem of cyan bronzing is not eliminated, and there is a tendency for degradation of image quality even with this cyan pigment.

To achieve high-quality color image formation, there are thus renewed calls for an ink jet recording medium that not only gives high ink absorbability, good colorability, and good water resistance, light-fastness and gas resistance, but also gives a low degree of 'bronzing'.

SUMMARY OF THE INVENTION

With the foregoing in view, it is an object of the present invention to provide an ink jet recording medium that has excellent properties required in ink jet recording and for which the phenomenon of bronzing is prevented, along with a recording method for the ink jet recording medium, and a recorded article produced by recording an ink image on the ink jet recording medium.

The inventors of the present invention carried out assiduous studies to attain the above object, and as a result discovered that, by controlling the degree of cationization in the ink-receiving layer of the ink jet recording medium, the above problems can be solved effectively. The present invention was achieved based on this finding.

An ink jet recording medium of the present invention comprises a substrate, and an ink-receiving layer that consists of at least one layer, is provided on the substrate and has an outermost surface, wherein the degree of cationization at the outermost surface is different to the degree of cationization in the ink-receiving layer other than the outermost surface.

In a preferred form of the present invention, the degree of cationization at the outermost surface is lower than the degree of cationization in the ink-receiving layer other than the outermost surface.

An ink jet recording medium of the present invention comprises a substrate, and at least one ink-receiving layer that is provided on the substrate and has an outermost surface, wherein the degree of cationization in an upper ink-receiving layer part from the outermost surface to a depth of 10 $\mu$m in the thickness direction is different to the degree of cationization in a remaining ink-receiving layer part comprising the ink-receiving layer other than the upper ink-receiving layer part.

In a preferred form of the present invention, the degree of cationization in the upper ink-receiving layer part is lower than the degree of cationization in the remaining ink-receiving layer part.

In a preferred form of the present invention, the total thickness of the ink-receiving layer is at least 20 μm.

An ink jet recording medium of the present invention comprises a substrate, and at least two ink-receiving layers provided on the substrate, wherein the ink-receiving layers have an outermost surface and comprise an upper ink-receiving layer part existing on a side from which ink is received and a remaining ink receiving layer part comprising the ink-receiving layers other than the upper ink-receiving layer part, and the extent of cationization in the upper ink-receiving layer part is different to the extent of cationization in the remaining ink-receiving layer part.

In a preferred form of the present invention, the degree of cationization in the upper ink-receiving layer part is lower than the degree of cationization in the remaining ink-receiving layer part.

In a preferred form of the present invention, the ink jet recording medium further comprises a glossy layer having a glossiness of at least 20 as determined by the 75° specular gloss test stipulated in JIS P 8142 formed on the outermost surface.

An ink jet recording method of the present invention comprises the step of attaching a cyan ink onto an ink jet recording medium as described above such that the dye amount is at least 0.3 mg/inch$^2$.

An ink jet recording method of the present invention comprises a recording step of recording on an ink jet recording medium as described above using an ink containing a metal-containing dye.

In a preferred form of the present invention, the ink used in the recording step is a cyan ink having an absorption spectrum such that the maximum absorbance $Abs_{600-650}$ in a range of 600 to 650 nm is greater than the maximum absorbance $Abs_{650-700}$ in a range of 650 to 700 nm.

In a preferred form of the present invention, the cyan ink contains a compound represented by the undermentioned formula.

(I) Formula I (see below)
(In the formula, M represents a hydrogen atom, an alkali metal, alkaline earth metal, an alkylamine or alkanolamine cation, or ammonium, and a, b, c and d are each 0 or 1, such that the total thereof is an integer from 1 to 4.)

An ink jet recorded article according to the present invention comprises an ink jet recording medium as described above having an ink image formed thereon.

Note that in this specification, the degree of cationization of the ink-receiving layer means the amount of cationic species contained in the ink-receiving layer. Specifically, the relative abundance of cationic species can be calculated from the peak area ratio (N1s/C1s) for nitrogen atom N1s to carbon atom C1s as measured using X-ray photoelectron spectroscopy in the thickness direction of the ink-receiving layer, as disclosed in Japanese Patent Application Laid-open No. 2001-10214.

In the X-ray photoelectron spectroscopy, X-rays are irradiated onto inorganic metal cations existing in the ink-receiving layer, and by measuring the characteristic kinetic energy of the photoelectrons thus ejected from the metal cations, the metal cations can be identified and the amount contained thereof can be calculated.

DESCRIPTION OF THE PREFERRED EMBODIMENTS

The ink jet recording medium of the present invention will now be described in detail through preferred embodiments thereof.

Figure 1:
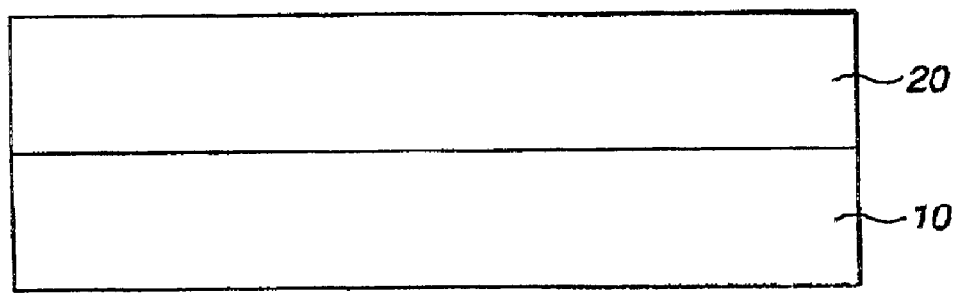
FIG. 1 is a cross-sectional view of an ink jet recording medium having a single ink-receiving layer according to an embodiment of the present invention.

As shown in FIG. 1, the ink jet recording medium of the present invention is constituted from a substrate 10 and an ink-receiving layer 20 that is provided on the substrate 10 and into which ink is absorbed and thus fixed. The ink-receiving layer may also be constituted from 2 or more layers. However, to explain the characteristic features of one embodiment of the present invention, in FIG. 1 an ink-receiving layer consisting of one layer is shown as an example.

Moreover, if required, a glossy layer may be provided as a surface layer on top of the ink-receiving layer 20, and a back coat layer may be provided to prevent curling of the substrate 10. In the case that the glossy layer is provided, it is preferable for the glossiness as determined by the 75° specular gloss test stipulated in JIS P 8142 to be at least 20. Furthermore, instead of the back coat layer, it is also possible to provide an ink-receiving layer like the ink-receiving layer 20 (these cases are not shown in the drawings).

The substrate 10 used in the present invention which has an ink-receiving layer applied onto at least one surface thereof may be base paper that has as a principal component thereof a chemical pulp such as LBKP or NBKP, a mechanical pulp such as CP, PGW, RMP, TMP, CTMP, CMP or CGP, a waste paper pulp such as DIP, wood pulp, or a synthetic fiber pulp such as a polyethylene fiber pulp, has one or more of various additives commonly used in paper making mixed therein as necessary, for example pigments, sizing agents, fixing agents, yield improving agents and paper strengthening agents, and is manufactured using any of various apparatuses such as a wire paper machine, a cylinder paper machine or a twin wire paper machine. The substrate 10 may also be such base paper onto which a size press or anchor coat layer of starch, polyvinyl alcohol or the like has been provided, or coated paper (including art paper, cast-coated paper etc.) in which a coating layer is provided thereupon.

The ink-receiving layer may be applied onto the base paper or coated paper as is, or before the application of the ink-receiving layer, a calender such as a machine calender, a TG calender or a soft calender may be used to control the flatness of the paper.

Moreover, the substrate may also be base paper as described above with a polyolefin resin layer provided thereon, or may be a film material of a synthetic resin such as polyethylene, polypropylene, a polyester, nylon, rayon or a polyurethane or a mixture thereof, or a sheet formed from fibers of such a synthetic resin.

Furthermore, a substrate having one or both surfaces thereof laminated with a synthetic resin such as polyethylene can also be used, and the polyethylene may be made to contain titanium oxide or zinc oxide to improve the screening properties.

The ink-receiving layer 20 in the ink jet recording medium of the present invention comprises at least one ink-receiving layer, and is constituted from pigment(s), polymer(s) and additive(s).

To obtain good ink absorbability and coloring density, as the pigment(s) contained in the ink receiving layer 20 in the present invention, one or more pigments that are commonly used and are insoluble or hardly soluble in water can be used. Specific examples include pigments that are porous and have a low refractive index, for example amorphous silica, precipitation method silica, gel type silica, colloidal silica, anhydrous alumina, hydrated alumina (preferably having a pseudo-boehmite structure), vapor phase method silica, barium sulfate, titanium dioxide, calcium carbonate, kaolin, clay, magnesium silicate, and calcium silicate.

A polymer contained in the ink-receiving layer 20 in the present invention is preferably a cationic polymer. Specific examples of such a cationic polymer include polyethylene imine salts, a dimethylamine epihalohydrin condensate, polyvinyl amine salts, polydimethylaminoethyl methacrylate quaternary salts, polydiallyldimethyl ammonium salts, salts of a diallylamineacrylamide copolymer, and polystyrene quaternary ammonium salts.

Moreover, to obtain good fixing strength and ink absorbability, a water-soluble resin having good film forming properties may be used as another polymer in the ink receiving layer 20 in the present invention. Specific examples of such a binder include polyvinyl alcohol, vinyl acetate, oxidized starch, etherified starch, cellulose derivatives such as carboxymethyl cellulose and hydroxyethyl cellulose, casein, gelatin, soy protein, carboxyl-modified polyvinyl alcohol, silyl-modified polyvinyl alcohol, and other water-soluble resins such as water-soluble acrylic polymers.

Furthermore, maleic anhydride resins, conjugated diene copolymer latexes such as styrene-butadiene copolymers and methyl methacrylate-butadiene copolymers, acrylic polymer latexes such as polymers or copolymers of acrylic acid esters and methacrylic acid esters, vinyl polymer latexes such as ethylene-vinyl acetate copolymers, functional-group-modified polymer latexes in which such copolymers are modified with monomers containing functional groups such as carboxyl groups, water-based adhesives such as thermosetting synthetic resins such as melamine resins and urea resins, and synthetic resin adhesives such as polymethyl methacrylate, polyurethane resins, unsaturated polyester resins, vinyl chloride-vinyl acetate copolymers, polyvinyl butyral and alkyd resins can also be used, either singly or in combination.

The polymer to pigment mixing ratio in the ink-receiving layer 20 in the present invention is preferably in a range of 1:1 to 1:15, more preferably 1:1.5 to 1:12, yet more preferably 1:2 to 1:10.

Moreover, an inorganic water-soluble metal salt as disclosed in Japanese Patent Application Laid-open No. 59-155086 or Japanese Patent Application Laid-open No. 60-67190 can also be added to the ink-receiving layer 20 in the present invention. Examples of such cationic compounds are ones containing polyvalent metal ions such as $Al^{3+}$, $Ca^{2+}$ and $Mg^{2+}$. Such cationic compounds form ionic bonds with sulfonic acid groups or carboxyl groups in a dye and thus act to capture the dye which forms an insoluble complex.

Other additives that may be mixed into the ink-receiving layer 20 in the present invention as necessary include pigment dispersants, thickeners, fluidity improvers, antifoaming agents, foam suppressing agents, mold-releasing agents, foaming agents, penetrants, coloring dyes, coloring pigments, fluorescent whitening agents, ultraviolet absorbers, antioxidants, preservatives, waterproofing agents, and hardening agents.

The components that form the ink-receiving layer 20 are dissolved or dispersed in water or a suitable solvent to prepare an application liquid, and the application liquid is then applied onto the substrate 10 using a suitable method such as a core coating method, a grade coating method, an air knife coating method, a bar coating method, a gravure coating method, a comma coating method, or a die coating method.

The application amount or the ink-receiving layer 20 (in terms of solids) is determined as appropriate, but in general is preferably 1 to 40 $g/m^2$, more preferably 2 to 30 $g/m^2$, yet more preferably 5 to 20 $g/m^2$.

Moreover, in the case of a 2-layer type ink-receiving layer in which a lower ink-receiving layer is applied onto the substrate 10 and then an upper ink-receiving layer is applied on top of the lower ink-receiving layer, whereupon better image resolution, water resistance and the like can be obtained, the application amount for the lower ink-receiving layer is preferably 1 to 40 $g/m^2$, more preferably 2 to 30 $g/m^2$, yet more preferably 5 to 20 $g/m^2$, and the application amount for the upper ink-receiving layer is preferably 1 to 15 $g/m^2$, more preferably 5 to 15 $g/m^2$, yet more preferably 5 to 10 $g/m^2$.

If the application amounts are below such ranges, then it will not be possible to obtain sufficient ink absorbability and fixability, whereas if the application amounts are above such ranges, then there will be a drop in productivity and an increase in cost. In particular, if the application amount for the upper ink-receiving layer exceeds 15 $g/m^2$, then it will be difficult for the ink to pass through the upper ink-receiving layer, and hence there will be a risk of blurring or the like occurring and the vividness of the image being lost. When forming a plurality of ink-receiving layers on top of one another, it is thus preferable to control the application amounts for the ink-receiving layers in accordance with the number of ink-receiving layers.

Moreover, after the application of the ink-receiving layer (s), finishing may be carried out using a calender such as a machine calender, a TG calender, a super calender or a soft calender.

A description will now be given of the prevention of the bronzing phenomenon, which is an object of the ink jet recording medium of the present invention. The inventors of the present invention found a relationship between the bronzing phenomenon and the degree of cationization in the ink-receiving layer, and based on this finding discovered how to resolve the bronzing problem.

Specifically, it was ascertained that, in the case of a cyan ink in particular, if the degree of cationization in the ink-receiving layer is high then bronzing occurs markedly, whereas if the degree of cationization in the ink-receiving layer is low then bronzing tends not to occur.

Here, the degree of cationization in the ink-receiving layer can be calculated as described earlier in the case that the cationic polymer in the ink-receiving layer has an ammonium group. Moreover, the degree of cationization can also be calculated as described earlier in the case that inorganic metal ions exist in the ink-receiving layer.

The cause of the cyan bronzing phenomenon can be thought of as being as follows, although the present invention is not limited to the following reasoning. A cyan dye has larger molecules than a magenta or yellow dye, and hence penetrates into the ink-receiving layer with more difficulty than dyes of other colors. Moreover, cationic substances in the ink-receiving layer have a function of capturing and thus fixing the dyes contained in the inks. It is thus inferred that a cyan dye has a higher tendency to be captured and fixed in the outermost surface part of the ink-receiving layer than other dyes.

Based on this knowledge, it is thought that if the degree of cationization in the outermost surface part of the ink-receiving layer is controlled, specifically reduced, then the cyan dye will penetrate into the ink-receiving layer more easily, resulting in the cyan bronzing phenomenon being eliminated.

Furthermore, in this case the magenta and yellow dyes will also penetrate more deeply into the ink-receiving layer, and will thus be fixed more firmly in the ink-receiving layer, resulting in it being possible to improve the water resistance, the light-fastness and the colorability.

A description will now be given of the control of the degree of cationization in the ink-receiving layer. By controlling the amount added into the ink-receiving layer application liquid of cationic species, for example a water-soluble cationic polymer such as a quaternary ammonium salt of polyethylene imine, polydiallylamine or an alkylamine polymer, a cationic resin emulsion, an inorganic metal type cationic component or a cationic surfactant, or by using components having different degrees of cationization, the amount of cationic species can be controlled, and hence the degree of cationization can be controlled.

Specific examples of the above cationic species include the cationic polymer contained in the ink-receiving layer in the present invention, and inorganic water-soluble metal cations such as $Al^{3+}$, $Ca^{2+}$ and $Mg^{2+}$, although there is no such limitation.

Specific examples of components having different degrees of cationization include polydiallylamine derivatives, dicyandiamide acid derivatives, polyalkylene polyamine derivatives and polyamine derivatives, wherein the degree of quaternization is at least 30%, preferably at least 50%, and the molecular weight is at least 5,000, preferably about 5,000 to 100,000, although there is no limitation to these compounds.

In addition to controlling the addition of cationic substances into the ink-receiving layer application liquid as described above, the degree of cationization in the outermost surface part of the ink-receiving layer can also be controlled by carrying out surface treatment on the outermost surface part of the ink-receiving layer after the ink-receiving layer has been formed. Specifically, after the ink-receiving layer has been formed, the degree of cationization in the outermost surface part of the ink-receiving layer and the degree of cationization in the inside of the ink-receiving layer can be controlled by a method such as coating or spraying. For example, by carrying out post-treatment with an anionic, nonionic or amphoteric component, the degree of cationization in the outermost surface part can be reduced.

Inks containing dyes as colorants can be used with the ink jet recording medium of the present invention. There are no particular limitations on the dyes, but it is preferable, for example, to use water-soluble acidic dyes, direct dyes, basic dyes and reactive dyes listed in the Color Index. With the present invention, a black ink may be used, and colored inks may also be used. Moreover, the inks may contain a glycol ether. By adding a glycol ether, the penetrability of the ink into the recording medium can be made high, and thus recording with little blurring can be carried out with various recording media.

There are no particular limitations on colored inks used with the ink jet recording medium according to the present invention, with it being possible to use conventional publicly-known colored inks as deemed appropriate. Preferable examples of a dye used in a magenta ink include dyes represented by undermentioned formula (II) as disclosed in Japanese Patent Application Laid-open No. 9-241555, specifically MJR580 made by Mitsubishi Chemical Corporation, dyes represented by undermentioned formula (III) as disclosed in Japanese Patent Application Laid open No. 10-306221, dyes represented by undermentioned formula (IV) as disclosed in Japanese Patent Application Laid-open No. 11-29714, and dyes represented by undermentioned formula (V) as disclosed in Japanese Patent Application Laid-open No. 2000-109464. Preferable examples of a dye used in a yellow ink include metal-containing dyes, direct yellow 86 and direct yellow 132.

(II) Formula II (see below)
(In formula (II), $R_1$, $R_2$ and $R_2$ each represents an alkyl group, an alkoxy group, a halogen atom, a hydrogen atom, a hydroxy group, a carbamoyl group, a sulfamoyl group, an amino group, a nitro group, a sulfonic acid ester group, a carboxyl group, or a carboxylic acid ester group, and $R_4$, $R_5$ and $R_6$ each represents a hydrogen atom, an alkyl group, an alkenyl group, an allyl group, an aralkyl group, an alicyclic group, or a heterocyclic group.)

(III) Formula III (see below)
(In formula (III), $R_1$ represents an alkoxycarbonyl group, a carboxy group or a benzoyl group, $R_2$ represents a hydrogen atom or an alkyl group, and $R_3$ and $R_5$ each represents a hydrogen atom, a halogen atom, an alkyl group or an alkoxy group.)

(IV) Formula IV (see below)
(In formula (IV), $R_1$ represents an alkoxycarbonyl group, a carboxy group, a benzoyl group or a 3-sulfobenzoyl group, $R_2$ represents a hydrogen atom or an alkyl group, $R_3$ and $R_4$ each represents a halogen atom, an alkyl group or an alkoxy group, and n is an integer from 1 to 3.)

(V) Formula V (see below)
(In formula (V), $R_1$ represents a hydrogen atom, an alkoxycarbonyl group, or a benzoyl group, and $R_2$ represents a hydrogen atom or a methyl group.)

From hitherto, cyan inks have had a characteristic of having better light-fastness and the like than magenta inks and yellow inks. According to a recording method in which formation of an image (possibly including writing) is carried out on the ink jet recording medium of the present invention using such a cyan ink containing a metal-containing dye having a copper phthalocyanine backbone such as direct blue 86, direct blue 87 or direct blue 199, an ink jet recorded article can be obtained with a high image quality and no bronzing phenomenon.

However, it is known that even such a metal-containing cyan dye may discolor under acidic conditions or in an oxidizing gas atmosphere, for example under the presence of ozone, nitrogen oxides or sulfur oxides in the air. Japanese Patent Application Laid-open No. 2000-303009 discloses cyan compounds that do not discolor much even under acidic conditions or in an oxidizing gas, represented by undermentioned formula (I). If a recording method is adopted in which formation of an image (possibly including writing) is carried out on the ink jet recording medium of the present invention using a cyan ink containing such a cyan dye, then an ink jet recorded article can be obtained with a yet higher image quality and no bronzing phenomenon.

(I) Formula I (see below)
(In the formula, M represents a hydrogen atom, an alkali metal, an alkaline earth metal, an alkylamine or alkanolamine cation, or ammonium, and a, b, c and d are each 0 or 1, with the total thereof being an integer from 1 to 4.)

As described above, even if a hitherto publicly-known cyan ink is used with the ink jet recording medium for which the degree of cationization is controlled according to the present invention, a recorded article with a high image quality and no bronzing phenomenon can be obtained, and moreover if a cyan dye having a chemical structure as in formula (I) above is used, then ink jet recording with a yet higher image quality can be realized.

A description will now be given of what ink attachment amount is suitable when using the ink jet recording medium of the present invention. The suitable ink attachment amount depends on the resolution, the ink discharge amount, and the dye content in the ink used, but can be calculated using the following examples. For example, under conditions of a high resolution of at least 720 dpi and a dye content in the ink of 3.5%, to obtain good colorability at a resolution of 720 dpi×720 dpi, in the case of a discharge amount of about 20 pl, the dye must be attached at a density of about 0.36 mg/inch$^2$, and to obtain a resolution of 1440 dpi×720 dpi, in the case of a discharge amount of about 10 pl, the dye must be attached at a density of about 0.36 mg/inch$^2$.

Using the ink jet recording medium according to the present invention will have an effect of preventing bronzing, but if the dye attachment amount is less than 0.3 mg/inch$^2$, then the colorability will drop, and it will not be possible to obtain an ink jet recorded article having high image quality.

EXAMPLES

The present invention will now be described in more detail through examples and comparative examples. It should be noted, however, that the present invention is not limited whatsoever by these examples. Note also that in the following examples, unless otherwise stated, '%' means weight % (in terms of solids).

In each of the examples and comparative examples, an ink jet recording medium was produced by applying ink-receiving layer application liquid(s) as indicated below onto high-quality 100 g/m$^2$ paper as a substrate using a bar coater and then drying.

Ink-receiving Layer Application Liquids for Example 1
(First Ink-receiving Layer Application Liquid)

| | |
|---|---|
| Hydrated alumina (Aluminasol 100 made by Nissan Chemical) | 5% |
| Polyvinyl alcohol (PVA117 made by Kuraray) | 1% |
| Water | 54% |
| (Second ink-receiving layer application liquid) | |
| Hydrated alumina (Aluminasol 100 made by Nissan Chemical) | 5% |
| Polyvinyl alcohol (PVA117 made by Kuraray) | 1% |
| Cationic polymer represented by undermentioned formula (VI) | 3% |
| Water | 51% |

(VI) Formula VI (see below)

The second ink-receiving layer application liquid was first applied onto the substrate, next the first ink-receiving layer application liquid was applied thereon, and then drying was carried out so that the thicknesses of the first and second ink-receiving layers each became about 10 μm, thus obtaining the ink jet recording medium of Example 1.

Ink-receiving Layer Application Liquids for Example 2
(First Ink-receiving Layer Application Liquid)

| | |
|---|---|
| Vapor phase method silica (Aerosil 380 made by Nippon Aerosil, average transient particle diameter 7 nm) | 5% |
| Polyvinyl alcohol (PVA117 made by Kuraray) | 1% |
| Cationic polymer represented by formula (VI) | 1% |
| Amphoteric surfactant (SWAM AM-2150 made by Nihon Surfactant Kogyo K.K.) | 0.3% |
| Water | 52.7% |
| (Second ink-receiving layer application liquid) | |
| Vapor phase method silica (Aerosil 380 made by Nippon Aerosil, average transient particle diameter 7 nm) | 5% |
| Polyvinyl alcohol (PVA117 made by Kuraray) | 1% |
| Cationic polymer represented by formula (VI) | 3% |
| Ampholeric surfactant (SWAM AM-2150 made by Nihon Surfactant Kogyo K.K.) | 0.3% |
| Water | 50.7% |

The ink jet recording medium of Example 2 was produced using the same method as in Example 1, again such that the thicknesses of the first and second ink-receiving layers each became about 10 μm.

Ink-receiving Layer for Example 3

First and second ink-receiving layers were formed as in Example 2, and then the glossy layer application liquid indicated below was applied and then dried such that the thickness thereof became 5 μm, thus producing the ink jet recording medium of Example 3.
[Glossy Layer Application Liquid]

| | |
|---|---|
| Polyvinyl alcohol (made by Kuraray; gelation degree 88) | 17% |
| Colloidal silica (made by Nissan Chemical) | 80% |
| Zr(OH)$_4$ (made by Nippon Light Metal) | 3% |

Ink-receiving Layer for Example 4

The outermost surface of KA420PSK PM photographic paper made by Seiko Epson Corporation as an ink jet recording medium was sprayed with an amphoteric surfactant (SWAM AM-2150 made by Nihon Surfactant Kogyo K.K.), thus producing the ink jet recording medium of Example 4.

Comparative Example 1

The ink jet recording medium of Comparative Example 1 was produced as in Example 1, except that the cationic polymer was omitted from the application liquid for forming the second ink-receiving layer.

Comparative Example 2

The ink jet recording medium of Comparative Example 2 was produced using the same method as in Example 2, except that the first and second ink-receiving layers were formed in the reverse order.

Comparative Example 3

The ink jet recording medium of Comparative Example 3 was produced by applying the second ink receiving layer of Example 1 using a bar coater and then drying such that the thickness thereof became 20 μm.
[Evaluation of Ink Jet Recording Media]

The degree of cationization was investigated for each of the ink jet recording media of Examples 1 to 4 and Comparative Examples 1 to 3. Moreover, the bronzing resistance, the light fastness, the water resistance, the colorability and the gas resistance were evaluated for each of the ink jet recording media of the examples and comparative examples using the criteria described below. Note that a PM-800C ink jet printer made by Seiko Epson Corporation was used in the evaluations. The inks used were cyan, magenta, yellow and black inks of standard specification for the PM-800C ink jet printer.

(Measurement of Degree of Cationization)

The cross section of the ink-receiving layer(s) in the thickness direction for each of the examples and comparative examples was examined by X-ray photoelectron spectroscopy. Specifically, a Quantum 2000 scanning X-ray photoelectron spectrometer made by Phi (USA) was used with an AlKα X-ray source, the photoelectron intake angle, which is the angle between the surface of the ink-receiving layer and the central axis of the spectrometer, was made to be 90°, and a beam diameter of not more than 10 μm was used. The energy resolution was set such that the half width of the Ag 3d5/2 peak when taking measurements on a clean silver plate was 1.0±0.05 eV.

An upper ink-receiving layer part comprising the ink-receiving layer(s) from the outermost surface to a depth of 10 μm in the cross-sectional direction of the ink-receiving layer(s), and a residual ink-receiving layer part comprising the ink-receiving layer(s) other than the upper ink-receiving layer part, were selected as samples for measuring the degree of cationization, and the degree of cationization was measured in the center of each of these parts.

Under the conditions described above, the area ratio (N1s/C1s) of the Nitrogen N1s peaks to the carbon C1s peaks was calculated as follows. That is, the area of a peak was obtained as the area intensity (CPSxeV: the sum of the detected intensity per unit time for each of the binding energies) of a peak obtained by subtracting the background from the originally obtained peak. In general, with photoelectron peaks, changes in peak shape called chemical shifts due to differences in binding state are observed, and for the carbon atom C1s photoelectron peaks the intensities of all of the peaks were calculated. Next, for the nitrogen atoms, calculation was carried out for all of the N1s photoelectron peaks, referring to the Handbook of X-ray Photoelectron Spectroscopy (published by Phi, USA). The degree of cationization was then estimated from the ratio of all of the N1s peaks to the C1s peaks. The qualitative measurement results are shown in Table 1 below.

TABLE 1

| | Degree of cationization | |
|---|---|---|
| | Upper ink-receiving layer part | Residual ink-receiving layer part |
| Example 1 | < | |
| Example 2 | < | |
| Example 3 | < | |
| Example 4 | < | |
| Comparative Example 1 | = | |
| Comparative Example 2 | > | |
| Comparative Example 3 | – | |

(Bronzing Resistance)

The bronzing resistance was evaluated using a glossiness evaluation method through 75° C. specular gloss tests as stipulated in JIS P 8142. A cyan solid printed part of density at least 2.0 was recorded onto the ink jet recording medium for each of the examples and comparative examples.

The regularly reflected light from the surface of the cyan solid printed part obtained was measured using a PG-1 gloss meter made by Nippon Denshoku Industries Co., Ltd. The amount of regular reflection was measured using the gloss meter, with a specular reflection angle of 75° being used.

The evaluation method was to measure the amount of regular reflection of both the printed surface and a reference surface, i.e. an unprinted surface, calculate the difference therebetween, and the use the following judgment criteria.
◯: Difference is less than 5% of amount of regular reflection for reference surface (absolute value)
Δ: Difference is less than 10% of amount of regular reflection for reference surface (absolute value)
X: Difference is more than 10% of amount of regular reflection for reference surface (absolute value)

(Light-fastness)

Using an Xe fade meter (Ci35A made by Atlas), accelerated tests were carried out under conditions of a 340 nm emission energy of 0.25 W/m², a black panel temperature of 63° C. and a relative humidity of 50%. The evaluation was carried out following ISO 10977 (Photography—Processed Photographic Color Films and Paper Prints—Methods for Measuring Image Stability). Specifically, output was carried out using normal inks such that the initial density was 1.0, the irradiation energy required for the residual density to drop to 70% for one of the colors cyan, magenta and yellow was measured, and the performance was evaluated according to the following criteria.
◯: More than 36×10³ klux·h of irradiation
Δ: Between 18×10³ klux·h and 36×10³ klux·h of irradiation
X: Less than 18×10³ klux·h of irradiation The results are shown in Table 2

(Water Resistance)

Cyan, magenta, yellow and black solid printed parts were recorded on the ink jet recording medium of each of the examples and comparative examples, a drop of tap water was dripped onto the printed parts using a dropping pipette, and the ink jet recording medium was left overnight to dry. The degree of blurring was then observed visually, and evaluation was carried out in accordance with the following criteria.
◯: No blurring occurred whatsoever with any of the 4 colors
Δ: Blurring occurred with at least 2 of the colors (within the range of acceptability in terms of practical use)
X: Blurring occurred with at least 3 of the colors (practical use not feasible)

The results are shown in Table 2.

(Colorability)

Cyan, magenta, yellow and black solid blocks were printed onto the ink jet recording medium of each of the examples and comparative examples, the mean value of the reflection density was measured, and evaluation was carried out in accordance with the following criteria. The color measurements were carried out using an SPM-50 spectrophotometer made by Gretag Macbeth.
◯: At least 1.8
Δ: At least 1.7, less than 1.8
X: Less than 1.7

The results are shown in Table 2.

(Gas Resistance)

Following the test method for color fastness of dyed textiles against nitric oxide (LO855) in the JIS standards, recording was carried out on the ink jet recording medium of each of the examples and comparative examples, and then the ink jet recording medium was left for 1 hour in nitric oxide gas. Visual comparison was then made with a recorded image that had not been exposed to nitric oxide gas, and the gas resistance was evaluated in accordance with the following criteria:

○: Hardly any change in hue
Δ Fairly large change in hue
X: Large change in hue

The results are shown in Table 2.

TABLE 2

|  | Bronzing resistance | Light-fastness | Water resistance | Colorability | Gas resistance |
|---|---|---|---|---|---|
| Example 1 | ○ | ○ | Δ | ○ | Δ |
| Example 2 | ○ | ○ | ○ | ○ | Δ |
| Example 3 | ○ | ○ | Δ | ○ | Δ |
| Example 4 | ○ | ○ | Δ | ○ | Δ |
| Comparative Example 1 | ○ | ○ | x | ○ | x |
| Comparative Example 2 | x | ○ | Δ | Δ | ○ |
| Comparative Example 3 | x | ○ | ○ | Δ | ○ |

An example will now be given of cyan bronzing prevention in the case of recording with a cyan ink on the ink jet recording medium of the present invention.

Using the recording medium of Example 2, the bronzing problem was investigated for when recording was carried out using the following two types of cyan ink.

Figure 2:
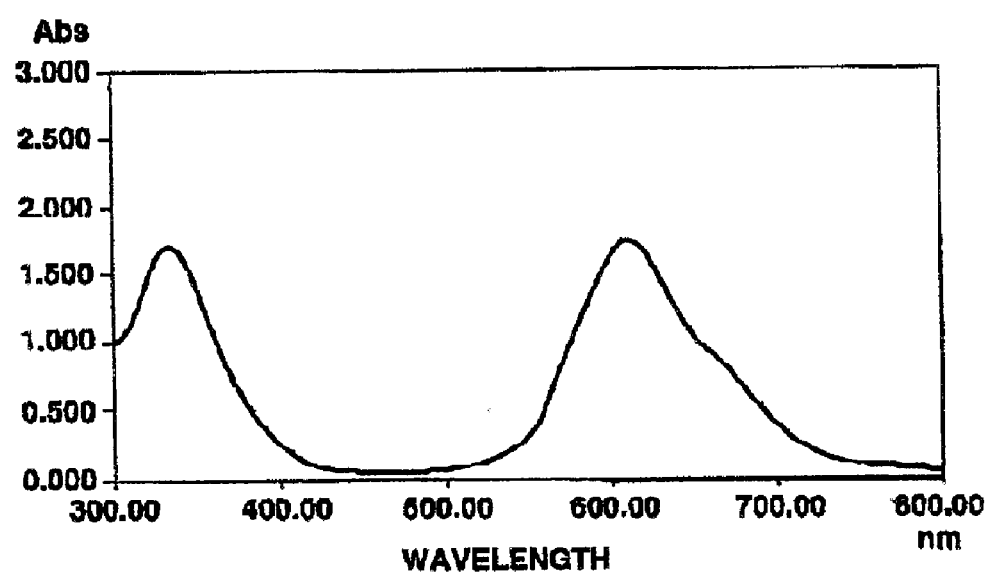
FIG. 2 is a graph showing the absorption spectrum of a particular cyan ink, wherein the horizontal axis shows the wavelength and the vertical axis the absorbance (Abs).

Cyan ink 1: Cyan ink used as standard with PM800C ink jet printer made by Seiko Epson Corporation Cyan ink 2: A cyan ink containing the metal-containing dye represented by undermentioned formula (I) and having the absorption spectrum shown in FIG. 2 (water used as solvent)

(I) Formula I (see below)
(In the formula, M represents a hydrogen atom, an alkali metal, an alkaline earth metal, an alkylamine or alkanolamine cation, or ammonium a, b, c and d are each 0 or 1, with the total thereof being an integer from 1 to 4.)

Note that the absorption spectrum for cyan ink 2 is such that the following relationship holds between the maximum absorbance $Abs_{600-650}$ in the range 600 to 650 nm and the maximum absorbance $Abs_{650-700}$ in the range 650 to 700 nm:

$$Abs_{600-650} > Abs_{650-700}$$

Recording was carried out onto the ink jet recording medium of Example 1 using cyan inks 1 and 2, and then the bronzing resistance was evaluated as described earlier.

The results are shown in Table 3.

TABLE 3

|  | Bronzing resistance | Light-fastness | Water resistance | Colorability | Gas resistance |
|---|---|---|---|---|---|
| Cyan ink 1 | ○ | ○ | ○ | ○ | Δ |
| Cyan ink 2 | ○ | ○ | ○ | ○ | ○ |

As is clear from the above results for the various examples and comparative examples, by using an ink jet recording medium having at least one ink-receiving layer, wherein the degree of cationization at the outermost surface of the ink-receiving layer(s) is different to the degree of cationization in the ink-receiving layer(s) other than the outermost surface, specifically wherein the degree of cationization in an upper part of the ink-receiving layer(s) is controlled so as to be lower than the degree of cationization in a lower part of the ink-receiving layer(s), the problem of bronzing can be resolved.

Moreover, through a combination of a particular cyan ink and the ink jet recording medium of the present invention, an ink jet recorded article can be obtained having good gas resistance and with the problem of bronzing being resolved.

According to the present invention, an ink jet recording medium is provided for which there is no problem of bronzing, colorability is good, and images having good light-fastness and water resistance can be realized.

Moreover, by combining the ink jet recording medium according to the present invention with a particular cyan ink, a recorded article can be provided having good gas resistance and with the problem of cyan bronzing being resolved.

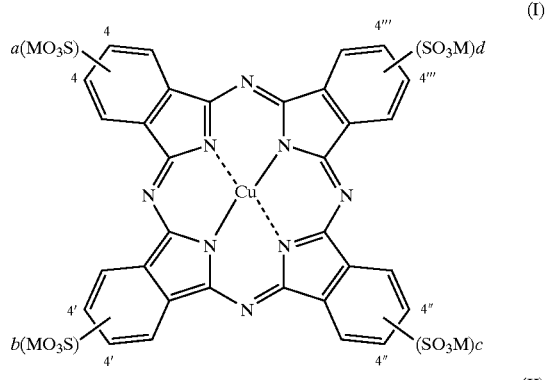

(I)

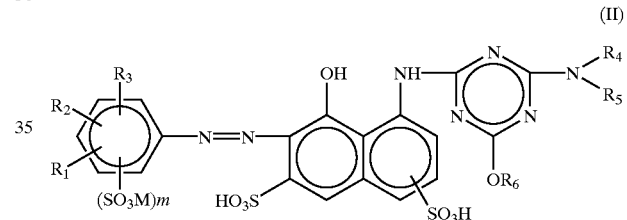

(II)

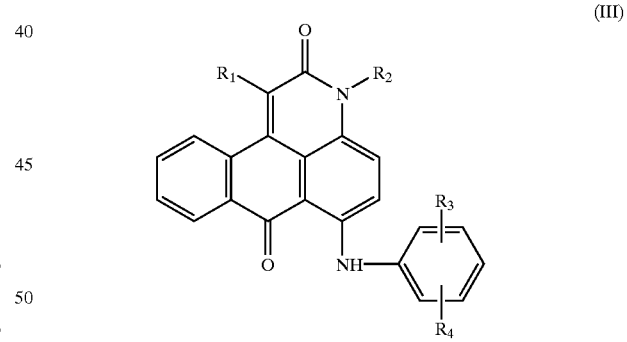

(III)

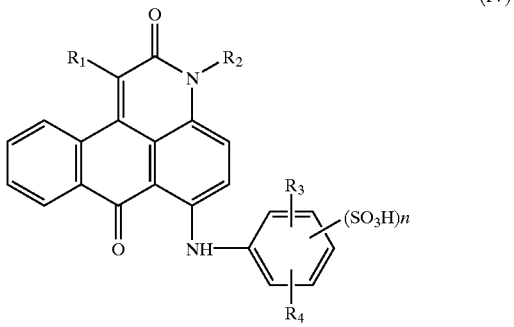

(IV)

-continued

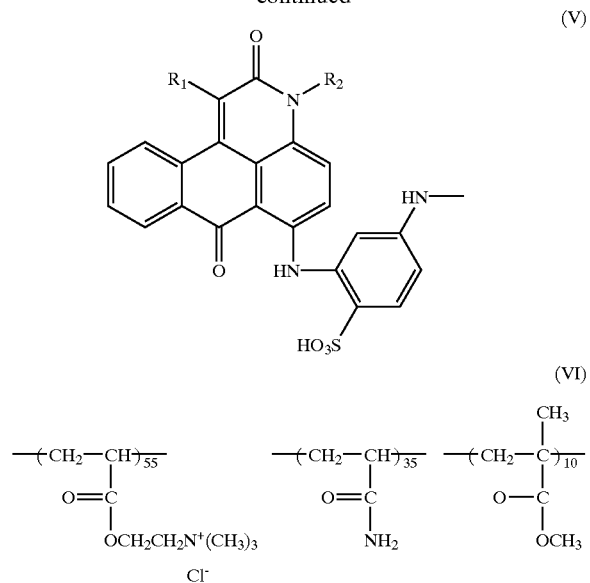

What is claimed is:

1. An ink jet recording medium, comprising:
a substrate; and
an ink-receiving layer that consists of at least one layer, is provided on said substrate and has an outermost surface;
wherein a degree of cationization at said outermost surface is lower than a degree of cationization in said ink-receiving layer other than said outermost surface.

2. An ink jet recording medium, comprising:
a substrate; and
an ink-receiving layer that consists of at least one layer, is provided on said substrate and has an outermost surface;
wherein a degree of cationization in an upper ink-receiving layer part from said outermost surface to a depth of 10 mm in a thickness direction lower than a degree of cationization in a remaining ink-receiving layer part comprising said ink-receiving layer other than said upper ink-receiving layer part.

3. The ink jet recording medium according to claim 2, wherein the total thickness of said ink-receiving layer is at least 20μm.

4. An ink jet recording medium, comprising:
a substrate; and
at least two ink-receiving layers provided on said substrate;
wherein said ink-receiving layers have an outermost surface and comprise an upper ink-receiving layer part existing on a side from which ink is received and a remaining ink-receiving layer part comprising said ink-receiving layers other than said upper ink-receiving layer part, and a degree of cationization in said upper ink-receiving layer part is lower than a degree of cationization in said remaining ink-receiving layer part.

5. The ink jet recording medium according to claim 1, further comprising a glossy layer having a glossiness of at least 20 as determined by a 75° specular gloss test stipulated in JIS P 8142 formed on said outermost surface.

6. An ink jet recorded article, wherein an ink image is formed on the ink jet recording medium according to claim 1.

7. The ink jet recording medium according to claim 2, wherein the total thickness of said ink-receiving layer is at least 20 μm.

8. The ink jet recording medium according to claim 2, further comprising a glossy layer having a glossiness of at least 20 as determined by a 75° specular gloss test stipulated in JIS P 8142 formed on said outermost surface.

9. The ink jet recording medium according to claim 4, further comprising a glossy layer having a glossiness of at least 20 as determined by a 75° specular gloss test stipulated in JIS 8142 formed on said outermost surface.

10. An ink jet recorded article, wherein an ink image is formed on the ink jet recording medium according to claim 2.

11. An ink jet recorded article, wherein an ink image is formed on the ink jet recording medium according to claim 4.

12. A recording medium comprising:
(a) a substrate; and
(b) an ink-receiving layer on the substrate; said ink-receiving layer comprising (i) a pigment, (ii) a water-soluble polymer, and (iii) a cationic specie or species; said cationic specie or species being present in the ink-receiving layer in an amount or amounts effective to improve a water resistance of an image formed by attaching an ink onto the ink-receiving layer as compared with a water resistance of an image formed by attaching the ink onto the ink-receiving layer without the cationic specie or species being present, said cationic specie or species being distributed in the ink-receiving layer such that a degree of cationization of an outer surface portion of the ink-receiving layer is lower than a degree of cationization of a portion of the ink-receiving layer below the outer surface portion so that a cyan ink deposited on the ink-receiving layer has a reduced tendency to agglomerate on a surface of the ink-receiving layer than the cyan ink deposited on the ink-receiving layer with the cationic specie or species distributed such that a degree of cationization is uniform throughout the ink-receiving layer.

13. The recording medium according to claim 12, wherein the cationic species comprises a water-soluble cationic polymer or a plurality of water soluble cationic polymers.

14. The recording medium according to claim 12, wherein the cationic species comprises inorganic water-soluble metal cations.

15. The recording medium according to claim 12, wherein the ink-receiving layer consists essentially of said water-soluble polymer, pigment and cationic specie or species.

* * * * *